June 11, 1935.  G. FASSIN  2,004,807
PHOTO-MICROGRAPHIC APPARATUS
Filed April 7, 1934  2 Sheets-Sheet 1

GUSTAVE FASSIN
INVENTOR

BY *J. A. Ellestad*
ATTORNEY

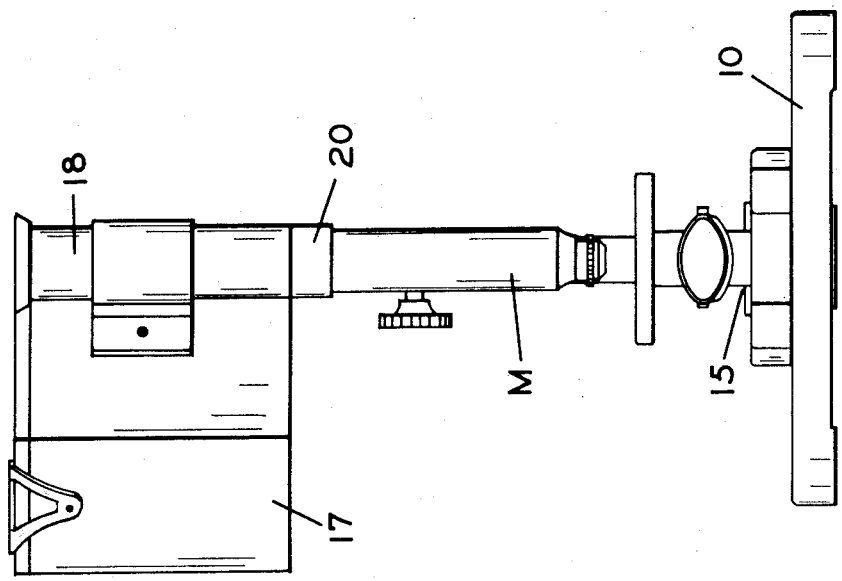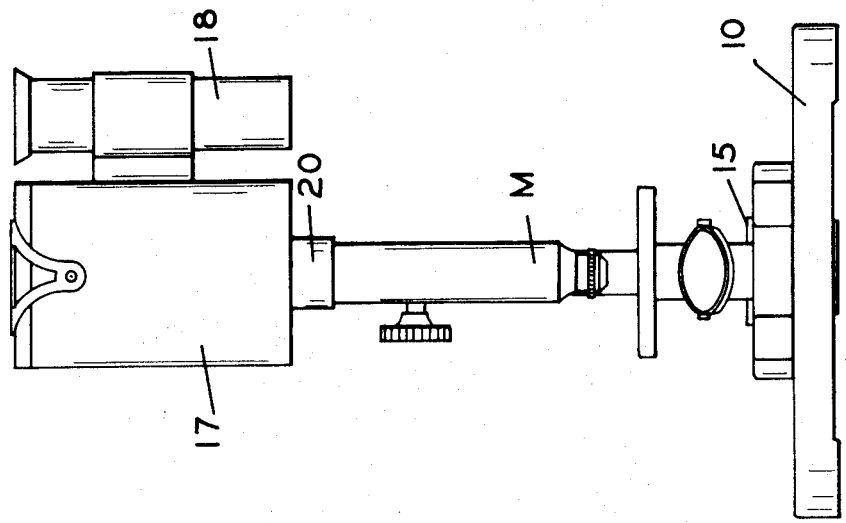

Patented June 11, 1935

2,004,807

UNITED STATES PATENT OFFICE 2,004,807

PHOTO-MICROGRAPHIC APPARATUS

Gustave Fassin, Irondequoit, N. Y., assignor to Bausch & Lomb Optical Company, Rochester, N. Y., a corporation of New York Application April 7, 1934, Serial No. 719,504

3 Claims. (Cl. 95—44)

This invention relates to photo-micrographic apparatus and has for one of its objects the provision of a relatively simple, yet efficient, device for taking photographs of objects through a microscope. Another object is to provide an apparatus of the type described having a focusing tube on the camera to enable the operator to secure proper focus and lighting adjustments. A further object is to provide a convenient focusing screen for a photo-micrographic apparatus embodying a type of camera which ordinarily does not have a focusing screen. These and other objects and advantages reside in certain novel features of construction, arrangement and combination of parts as will hereinafter be more fully described and pointed out in the appended claims.

Referring to the drawings:

Fig. 2 is a front view thereof showing the camera in operative relation to the microscope.

Fig. 3 is a front view showing the focusing tube in operative relation to the microscope.

Figs. 4 and 5 are sectional views of details.

Figure 1:
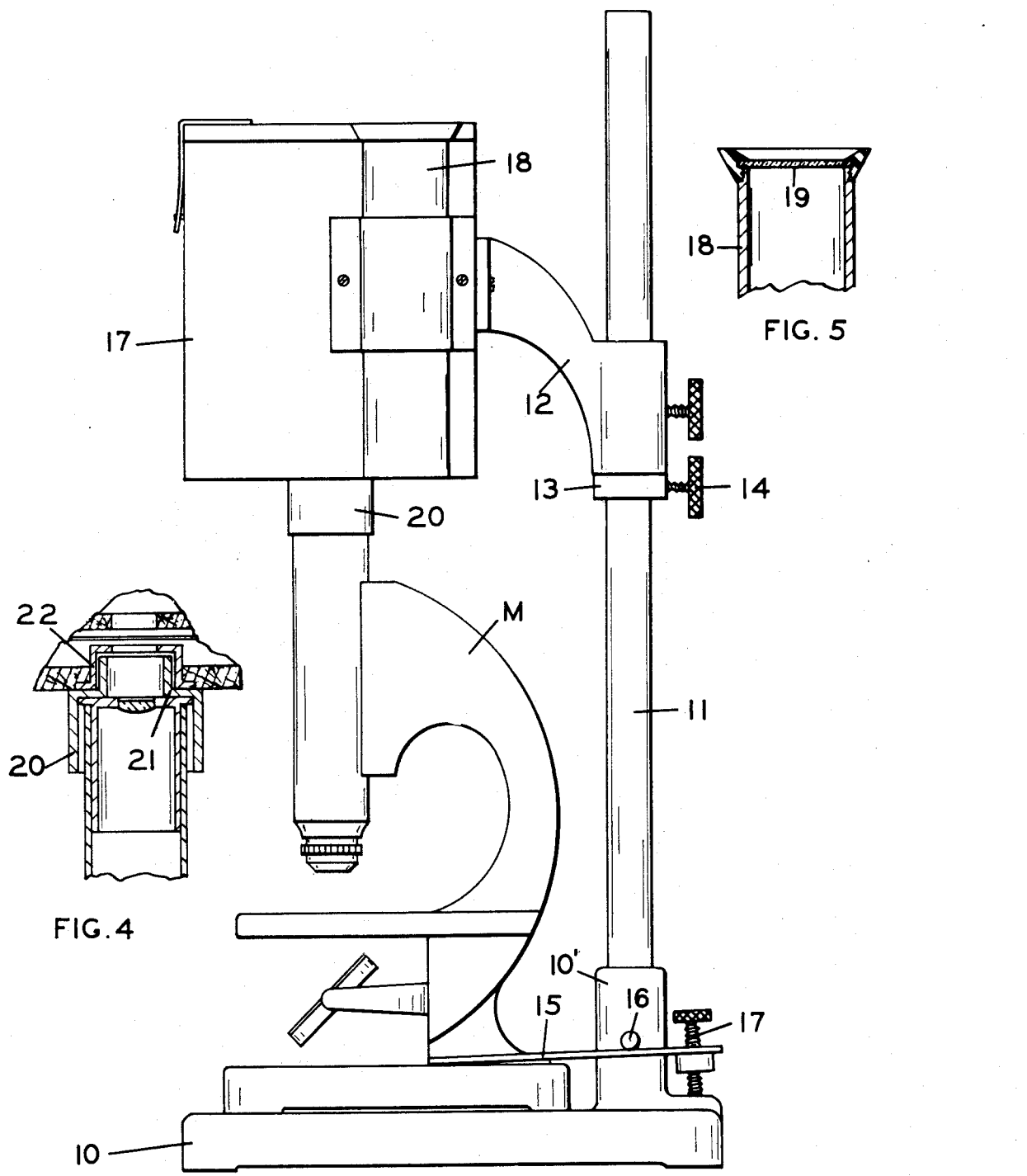
Fig. 1 is a side view of my device.

A preferred embodiment of my invention is disclosed in the drawings wherein 10 indicates a base carrying a vertical support rod 11 on which is slidably and rotatably mounted the bracket 12. A collar 13 also slidable on rod 11 acts as a stop to limit the vertical movement of bracket 12 and may be clamped in adjusted position by means of screw 14. A microscope M is detachably secured to base 10 by means of a clamp which comprises a U-shaped plate 15 which passes around the lug 10' and contacts with the base of the microscope. The top side of plate 15 engages the under side of pin 16 which projects outwardly from each side of lug 10' and screw 17 threaded to plate 14 urges the clamp downward against the base of the microscope.

Fixedly secured to bracket 12 is a camera 17 which may be of any suitable type, although I have shown a well known, inexpensive type of box camera which is adapted to hold a roll of sensitized film. Attached to the side of camera 17 is a tube 18 which is open at its lower end and closed at its upper end by a translucent screen element 19, such as ground glass or the like. The screen element 19 is positioned so that it lies substantially in the horizontal plane of the sensitized element which is in exposure position in camera 17. In order to form a light-tight connection between the microscope and camera and between the microscope and the focusing tube 18 there is positioned on top of the microscope ocular a connector tube 20 having an upwardly projecting reduced portion 21 adapted to fit into the opening 22 in the camera or into the open lower end of focusing tube 18.

In operation, the apparatus is set so that the focusing tube 18 is in operative alignment with the microscope. The microscope is then focused and the lighting adjusted so that the object on the microscope stage is sharply imaged on the screen 19. Such focusing adjustments are made by raising or lowering the bracket and camera so as to give a good image on the screen and the final focusing adjustment is made with the rack and pinion (not shown) on the microscope. The collar 13 is then set up against the lower side of the bracket. The focusing tube and camera are then raised up to clear the projecting part 21 of the connector tube 20 and the camera is swung into position above the microscope, as shown in Fig. 2, with the connecter tube 20 making a light-tight connection as shown in Fig. 4. Since the screen 19 lies in the plane of the film in the camera, the image of the object will be sharply focused on the film. The exposure is then made in the usual manner.

From the foregoing, it will be apparent that I am able to attain the objects of my invention and provide a photo-micrographic apparatus which will be relatively simple in structure yet convenient and efficient in operation. My device makes it possible to employ relatively cheap, simple cameras such as the well known types of box or folding cameras which do not have built-in focusing screens. The lens of the camera is preferably omitted as shown in Fig. 4. The screen 19 covers only a part of the field which will be photographed but it is sufficient to enable focusing. Furthermore, it often happens that the microscopist is interested in a small portion of the specimen and in such an event the image of the desired part can be focused and centered by means of my device. Because of its simplicity, my apparatus is especially adapted for use by amateurs. Various modifications can obviously be made without departing from the spirit of my invention.

I claim:

1. In a photo-micrographic apparatus the combination of a base, a support rod on said base, a bracket slidably and rotatably mounted on said rod, an adjustable collar on said rod for limiting the vertical movement of said bracket, a camera secured to said bracket, a focusing tube fixedly mounted on the side of said camera, a translucent screen element mounted in said tube, said element being positioned substantially in the plane of the sensitized element carried by said camera.

2. A photo-micrographic apparatus comprising a base, a microscope detachably secured to said base, a support rod on said base, a bracket slidably and swingably mounted on said rod, a collar adjustably mounted on said rod for limiting the vertical movement of the bracket, a box camera secured to said bracket, a vertically disposed focusing tube mounted on the side of said camera, the vertical dimensions of said tube and camera being substantially the same, and a screen element mounted in said tube and positioned substantially in the plane of the sensitized element carried by the camera.

3. A photo-micrographic apparatus comprising a support, a microscope positioned adjacent to said support, a camera mounted on said support, a focusing tube secured to said camera, a screen element mounted at the upper end of the tube, the lower end of the tube being open, a connector tube mounted on the eyepiece of the microscope, said connector tube having a reduced portion, said camera being movably mounted on said support whereby it or the focusing tube may be selectively positioned in alignment with the microscope with the reduced portion of the connector tube positioned in the camera opening or in the focusing tube.

GUSTAVE FASSIN.